United States Patent
Higby et al.

(10) Patent No.: US 10,595,419 B1
(45) Date of Patent: Mar. 17, 2020

(54) 3-D FLEX CIRCUIT FORMING (71) Applicant: INTERNATIONAL BUSINESS MACHINES CORPORATION, Armonk, NY (US)

(72) Inventors: Arthur Higby, Cottekill, NY (US); James Busby, New Paltz, NY (US); David C. Long, Wappingers Falls, NY (US); Robert Weiss, Lagrangeville, NY (US); Michael Fisher, Poughkeepsie, NY (US); Tristen Gaudette, Troy, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/170,005

(22) Filed: Oct. 24, 2018

(51) Int. Cl.
| | |
|---|---|
| H05K 3/32 | (2006.01) |
| B29C 33/00 | (2006.01) |
| B29C 33/44 | (2006.01) |
| B29C 33/12 | (2006.01) |
| B29C 44/02 | (2006.01) |
| B29C 44/08 | (2006.01) |
| B29C 44/12 | (2006.01) |
| B29C 70/00 | (2006.01) |
| B29C 70/84 | (2006.01) |
| H05K 3/46 | (2006.01) |
| G06F 21/87 | (2013.01) |

(Continued)

(52) U.S. Cl.
CPC ........... H05K 3/4691 (2013.01); G06F 21/87 (2013.01); H01L 23/315 (2013.01); H05K 1/0275 (2013.01)

(58) Field of Classification Search
CPC .......... H05K 3/32; H05K 3/326; B29C 33/00; B29C 33/44; B29C 33/12; B29C 44/02; B29C 44/08; B29C 44/12; B29C 44/86; B29C 44/146; B29C 44/351; B29C 70/00; B29C 70/84
USPC ............... 29/838, 426.4, 460, 873; 361/752; 264/46.4, 46.7, 272.11
See application file for complete search history.

(56) References Cited

U.S. PATENT DOCUMENTS 4,647,125 A * 3/1987 Landi ..................... H01R 12/61
29/873
4,792,843 A * 12/1988 Haghiri-Tehrani .........................
G06K 19/07745
235/488

(Continued)

FOREIGN PATENT DOCUMENTS

EP 1462907 A1 9/2004

Primary Examiner — Xiaoliang Chen
(74) Attorney, Agent, or Firm — Ira D. Blecker; Tihon Poltavets (57) ABSTRACT A fixture assembly for deforming a flex circuit that includes: a base plate having a recess; a wrinkle reducer plate having a first cut-out portion aligned with the recess; a stiffening block having a second cut-out portion aligned with the recess and the first cut-out portion; and a punch to slideably engage with the recess, the first cut-out portion and the second cut-out portion; wherein, in operation, a flex circuit is placed between the base plate and wrinkle reducer plate and the punch extends through the first cut-out portion and the second cut-out portion to engage the flex circuit and deform the flex circuit into the recess so that the flex circuit has a formed section in the shape of the recess and a flat section clamped by the wrinkle reducer plate and the base plate.

8 Claims, 7 Drawing Sheets

(51) Int. Cl.
    *H01L 23/31*       (2006.01)
    *H05K 1/02*        (2006.01)

(56) References Cited

U.S. PATENT DOCUMENTS

| | | | | |
|---|---|---|---|---|
| 4,904,429 | A | * | 2/1990 | Takahashi ........... B29C 33/0044 |
| | | | | 264/272.11 |
| 5,072,283 | A | * | 12/1991 | Bolger .................. H01L 23/057 |
| | | | | 257/672 |
| 5,095,628 | A | | 3/1992 | McKenney et al. |
| 5,394,602 | A | * | 3/1995 | Czapp .................. B60R 21/215 |
| | | | | 156/242 |
| 6,697,694 | B2 | | 2/2004 | Mogensen |
| 7,788,801 | B2 | | 9/2010 | Oggioni et al. |
| 7,804,985 | B2 | | 9/2010 | Szewerenko et al. |
| 7,958,627 | B2 | | 6/2011 | Randall et al. |
| 9,554,477 | B1 | | 1/2017 | Brodsky et al. |
| 9,578,764 | B1 | | 2/2017 | Fisher et al. |
| 2006/0099849 | A1 | * | 5/2006 | Aeschbacher ......... H01R 12/78 |
| | | | | 439/495 |
| 2008/0003404 | A1 | | 1/2008 | Yang et al. |
| 2008/0085334 | A1 | * | 4/2008 | Barnett ............... B29C 45/2738 |
| | | | | 425/110 |
| 2008/0229697 | A1 | * | 9/2008 | Bosman .............. B29C 44/1252 |
| | | | | 52/588.1 |
| 2016/0026030 | A1 | * | 1/2016 | Kang ................ G02F 1/133308 |
| | | | | 349/58 |
| 2018/0097274 | A1 | * | 4/2018 | Chen ........................ H01Q 1/40 |
| 2018/0110165 | A1 | | 4/2018 | Fisher et al. |
| 2018/0301643 | A1 | * | 10/2018 | Xu ...................... H01L 51/0097 |

\* cited by examiner

3-D FLEX CIRCUIT FORMING

BACKGROUND

The present exemplary embodiments pertain to secure module assemblies and, more particularly, to a structure, process of making and a fixture assembly for manufacturing components of the secure module assemblies.

Many activities require secure electronic communications. To facilitate secure electronic communications, an encryption/decryption system may be implemented on an electronic assembly or printed circuit board assembly that is included in equipment connected to a communications network.

Such an electronic assembly is an enticing target for malefactors since it may contain codes or keys to decrypt intercepted messages, or to encode fraudulent messages. To prevent this, an electronic assembly may be mounted in an enclosure, which is then wrapped in a security sensor and encapsulated with polyurethane resin.

A security sensor may be a web or sheet of insulating material with circuit elements, such as closely-spaced, conductive lines fabricated on it. The circuit elements are disrupted if the sensor is torn, and the tear can be sensed in order to generate an alarm signal. The alarm signal may be conveyed to a monitor circuit in order to reveal an attack on the integrity of the assembly. The alarm signal may also trigger an erasure of encryption/decryption keys stored within the electronic assembly.

BRIEF SUMMARY

The various advantages and purposes of the exemplary embodiments as described above and hereafter are achieved by providing, according to an aspect of the exemplary embodiments, a fixture assembly for deforming a flex circuit comprising: a base plate having a recess; a wrinkle reducer plate having a first cut-out portion aligned with the recess; a stiffening block having a second cut-out portion aligned with the recess and the first cut-out portion; and a punch to slideably engage with the recess, the first cut-out portion and the second cut-out portion; wherein, in operation, a flex circuit is placed between the base plate and wrinkle reducer plate and the punch extends through the first cut-out portion and the second cut-out portion to engage the flex circuit and deform the flex circuit into the recess so that the flex circuit has a formed section in the shape of the recess and a flat section clamped by the wrinkle reducer plate and the base plate.

According to another aspect of the exemplary embodiments, there is provided a process for deforming a flex circuit using a fixture assembly comprising a base plate having a recess, a flex circuit, a wrinkle reducer plate, a stiffening block and a punch, the process comprising: heating the fixture assembly to a predetermined temperature; applying a force to the punch causing the punch to contact the flex circuit, and deforming the flex circuit into the recess in the base plate; holding the punch in contact with the flex circuit for a predetermined amount of time while heating the fixture assembly at the predetermined temperature; cooling the fixture assembly to a second predetermined temperature with the punch in contact with the flex circuit; subsequent to the fixture assembly reaching the second predetermined temperature, removing the force of the punch; and removing the flex circuit from the fixture assembly, the flex circuit having a recessed portion resulting from deforming the flex circuit into the recess in the base plate and a flat portion surrounding the recessed portion.

According to a further aspect of the exemplary embodiments, there is provided a module assembly comprising: a circuit board; a first plurality of electronic components mounted on a first side of the circuit board; a first enclosure bonded to the first side of the circuit board and enclosing the first plurality of electronic components; a second enclosure bonded to a second side of the circuit board, the second enclosure comprising: a flex circuit having a recessed profile to match a profile of the second enclosure; and a second plurality of electronic components mounted on the flex circuit wherein the flex circuit and second plurality of electronic components are enclosed by the second enclosure.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIGS. 2 to 5 illustrate the formation of a flex circuit wherein

FIGS. 6 to 11 illustrate various views of a fixture assembly for deforming the flex circuit wherein:

FIGS. 8 to 11 illustrate the various components of the fixture assembly, except for the punch, as the fixture assembly is being assembled wherein:

DETAILED DESCRIPTION

Figure 1:
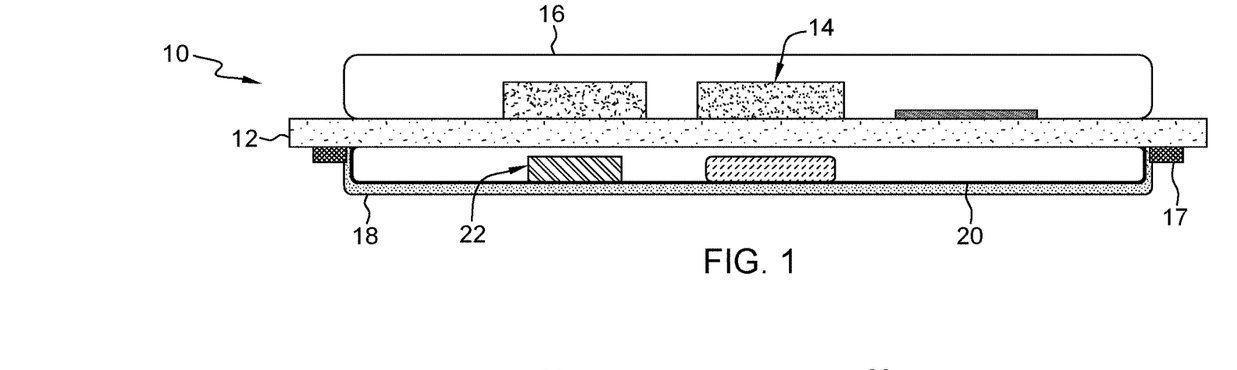
FIG. 1 illustrates a module assembly which may also include components to render the module assembly a secure module assembly.

Referring to the drawings in more detail, and particularly referring to FIG. 1, there is illustrated a module assembly 10 which may also include components to render the module assembly 10 a secure module assembly.

The module assembly 10 includes a circuit board 12, such as a printed circuit board 12, on which may be mounted electronic components, generally indicated by 14. The particular electronic components 14 are unimportant to the present exemplary embodiments but may include, for the purpose of illustration and not limitation, semiconductor devices, resistors, capacitors and input/output devices. Enclosing the electronic components 14 may be a cover 16 which may be made from aluminum or stainless steel, for example.

Below the circuit board 12 may be a tamper-resistant enclosure 18. The enclosure may be made from a metal such as aluminum or stainless steel. The tamper-resistant enclosure 18 may have feet 17 which may be used to bond the tamper-resistant enclosure 18 to the circuit board 12. The bond (not shown) may be, for example, an adhesive. Within the enclosure 18 is a flex circuit 20 which is formed so as to match the profile of the enclosure 18 and essentially lines the interior surface of the enclosure 18. The flex circuit 20 may contain several layers and on one or more layers, there may be security circuits, such as serpentine circuits, that may be connected to tamper detection circuits. The tamper detection circuits may erase encryption keys if an intrusion is detected, for example, if one or more of the tamper detection circuits is broken or disturbed. Located on the flex circuit 20 may be electronic components, generally indicated by 22. Again these electronic components 22 may include, for the purpose of illustration and not limitation, semiconductor devices, resistors, capacitors and input/output devices.

In the module assembly 10, the enclosure 18 is a low profile design which requires in the exemplary embodiments to form the flex circuit 20 to match the profile of the enclosure 18. For the purpose of illustration and not limitation, the exterior height of the enclosure 18 may be 0.5 to 2 mm as measured from the point of attachment to the circuit board 12.

A flex circuit is a flexible circuit board that has been made by laying down a layer of insulating material followed by layers of additional insulating material having metallic circuitry, for example, copper, formed on the insulating material. Topping the flex circuit may be another layer of insulating material. The various layers may be bonded together by a nonconductive adhesive. For purposes of illustration, the insulating material may be Kapton® polyimide manufactured by E. I. du Pont de Nemours.

Figure 2:
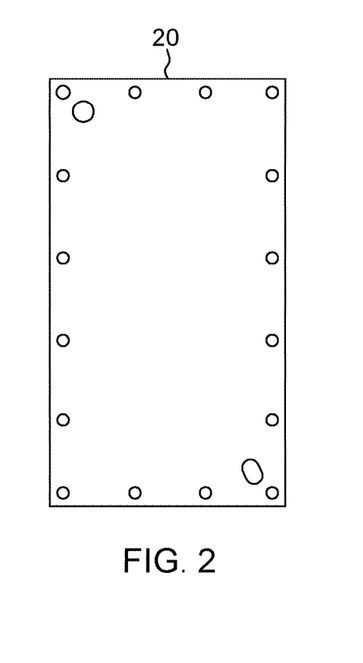
FIG. 2 illustrates a flat piece of the flex circuit before it is deformed in a shape necessary to match that of the enclosure.

Referring now to FIGS. 2 to 5, there is illustrated the formation of the flex circuit 20. In FIG. 2, there is illustrated a flat piece of the flex circuit 20 before it is deformed in a shape to match that of the enclosure 18. The flex circuit 20 is completed except for deforming into the desired shape. That is, the multiple layers of circuitry have been formed and bonded together to form the flex circuit 20. Tooling holes are shown along the perimeter of the flex circuit 20.

For the purpose of illustration and not limitation, the flex circuit 20 may have four layers of copper traces with each of the copper traces being 4 mils wide and a separation of 4 mils between copper traces. The insulating material may be Kapton® polyimide.

Figure 3:
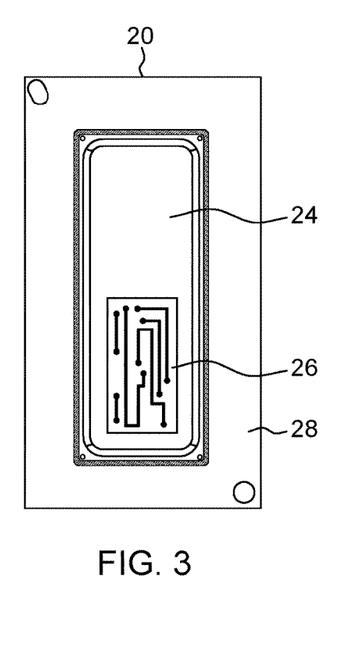
FIG. 3 illustrates the flat flex circuit in FIG. 2 has been deformed in a fixture assembly to form a recess.

Referring now to FIG. 3, the flat flex circuit 20 in FIG. 2 has been deformed in a fixture assembly (to be described hereafter) to form a recess 24. FIG. 3 is an enlarged view of FIG. 2 so that the tooling holes on the perimeter of the flex circuit 20 are not shown. Within recess 24 is located the electronic circuitry 26 for the flex circuit 20. The electronic circuitry 26 may include security circuits, such as serpentine circuits, that may be connected to tamper detection circuits. The electronic circuitry 26 is covered by a protective layer (not shown) to protect the electronic circuitry 26 from damage. The protective layer has no security value other than to protect the electronic circuitry 26 from damage.

Figure 4:
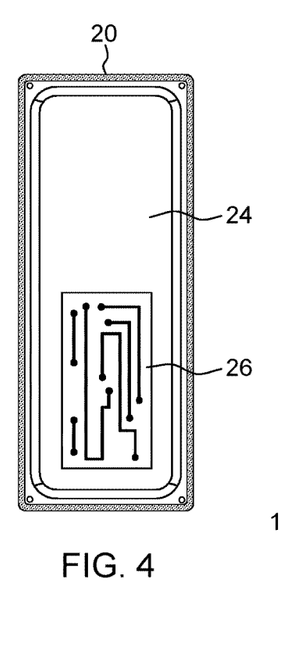
FIG. 4 illustrates the flex circuit of FIG. 3 has been trimmed to remove excess material.

The original flat portion 28 of the flex circuit 20 is no longer needed after the deformation step in FIG. 3. Most of the excess flat portion 28 of the flex circuit 20 is then cut off. The flex circuit 20 without the excess flat portion 28 is shown in FIG. 4.

Figure 5:
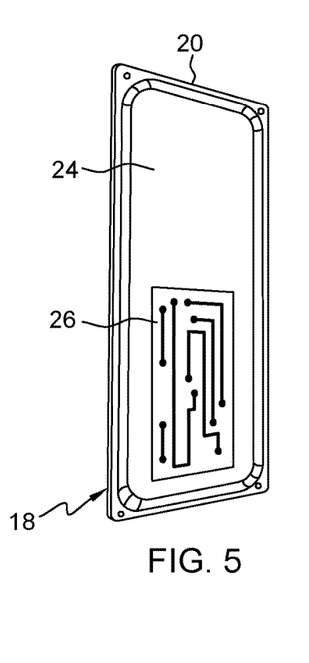
FIG. 5 illustrates the trimmed flex circuit of FIG. 4 has been placed within the enclosure.

Referring now to FIG. 5, the remaining portion of the flex circuit 20 with the recess 24 is placed within the enclosure 18. FIG. 5 has been slightly rotated to show a side portion of the enclosure 18. Before placing the flex circuit 20 within the enclosure 18, adhesive (not shown) may be applied to the flex circuit 20 and/or the interior of the enclosure 18 so that the flex circuit 20 may be bonded to the enclosure 18. Any electronic components 22 (FIG. 1) may be joined to the flex circuit 20 and then the enclosure 18 with the flex circuit 20 may be bonded, such as by an adhesive, to the circuit board 12.

Figure 6:
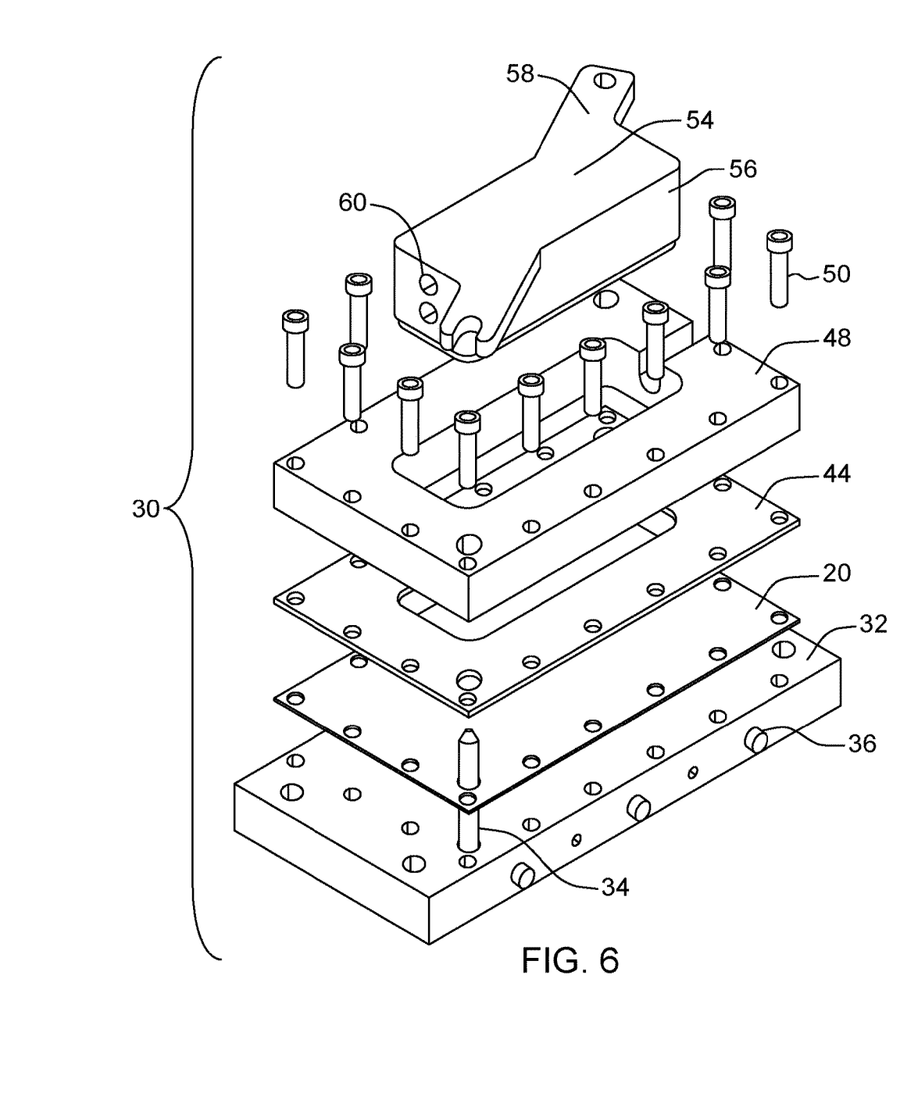
FIG. 6 illustrates an exploded view of the fixture assembly 30 for deforming the flex circuit.
Figure 7:
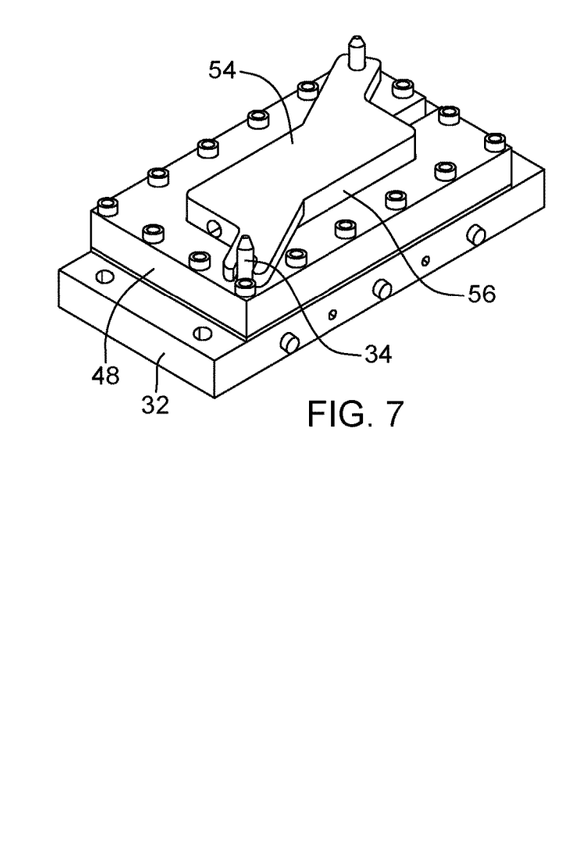
FIG. 7 illustrates a perspective view of the fixture assembly in its fully assembled state.
Figure 8:
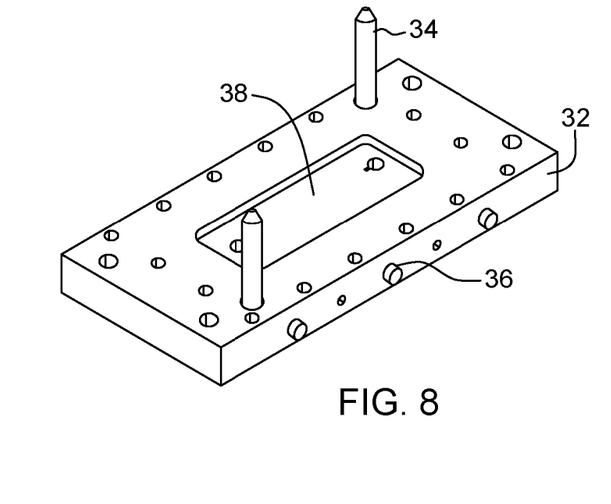
FIG. 8 illustrates a base plate having a recess.
Figure 9:
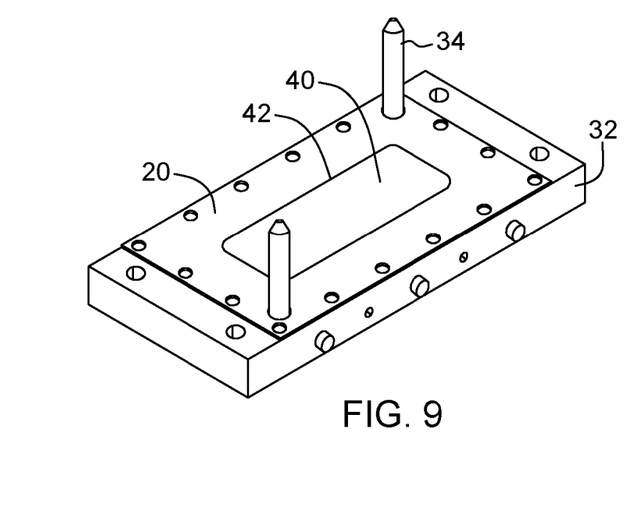
FIG. 9 illustrates a flat flex circuit placed on the base plate.
Figure 10:
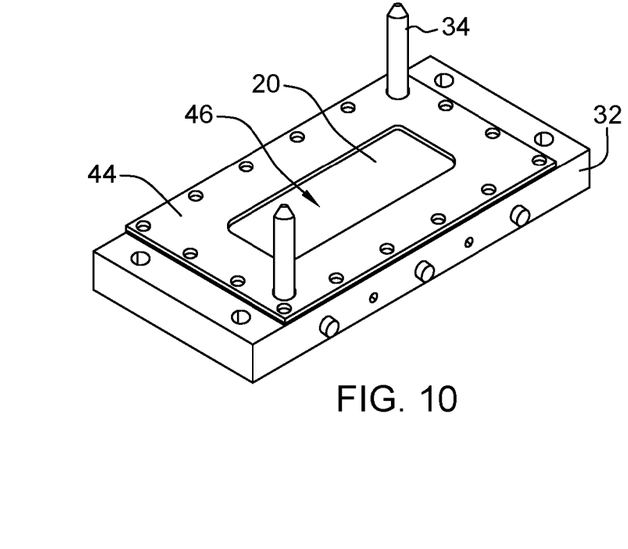
FIG. 10 illustrates the wrinkle reducer placed on the flat flex circuit.
Figure 11:
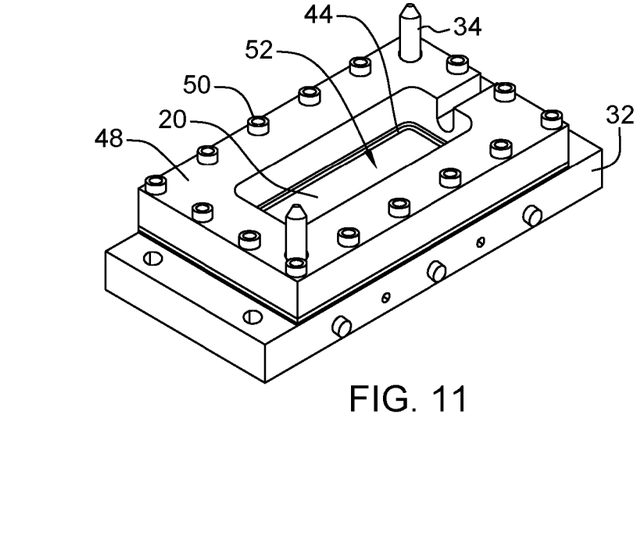
FIG. 11 illustrates the stiffening block placed on the wrinkle reducer.

FIG. 6 illustrates an exploded view of a fixture assembly 30 for deforming the flex circuit 20. FIG. 7 illustrates a perspective view of the fixture assembly 30 in its fully assembled state. FIGS. 8 to 11 illustrate the various components of the fixture assembly 30, except for the punch, as the fixture assembly 30 is being assembled.

In the following discussion, FIGS. 6 to 11 should be referred to.

The fixture assembly 30 includes a base plate 32 having alignment pins 34 for aligning the other components of the fixture assembly 30 and heaters 36 for heating the base plate 32. The base plate 32 may also include a recess 38 into which the flex circuit 20 will be deformed.

On top of the base plate 32 may be placed a flat flex circuit 20. The alignment pins 34 may be used to align the flex circuit 20 to the correct position on the base plate 32. The portion 40 of the flex circuit 20 within lines 42 is the part of the flex circuit 20 that may be deformed to form a recess 24 (FIGS. 2 to 5). The portion 40 is also where the electronic circuitry 26 has been previously formed.

A wrinkle reducer 44 may be placed on the flex circuit 20. The alignment pins 34 may be used to align the wrinkle reducer 44 to the correct position on the base plate 32 and also correctly align the wrinkle reducer 44 with respect to the flex circuit 20. The wrinkle reducer 44 may include a cut-out portion 46 which may correspond to the shape of the recess 38 in the base plate 32. The wrinkle reducer 44 limits the wrinkles that may be formed during the deformation of the flex circuit 20. These wrinkles are usually formed in the corners.

A stiffening block 48 may be placed on the wrinkle reducer 44 using the alignment pins 34 to assure correct alignment in the fixture assembly 30. The stiffening block 48 may include a cut-out portion 52 which may correspond to the shape of the recess 38 in the base plate 32. In one exemplary embodiment, the cut-out portion 52 may be larger than the cut-out portion 46 in the wrinkle reducer 44 so that the wrinkle reducer 44 may be partly exposed through the cut-out portion 52

The various components of the fixture assembly 30 and the flex circuit 20 may be rigidly secured by, for example, screws 50.

Further included with the fixture assembly 30 may be a punch 54 which fits within the cut-out portion 52 in the stiffening block 48 and is aligned to the fixture assembly 30 by the alignment pins 34. The punch 54 may freely move up and down within the fixture assembly 30. During the downward movement of the punch 54, the body 56 of the punch 54 may move through the cut-out portion 52 in the stiffening block 48 and the cut-out portion 46 in the wrinkle reducer 44 to contact the flex circuit 20. Further downward movement of the punch 54 may cause the deformation of the flex circuit 20 into the recess 38 of the base plate 32 to form recess 24 in the flex circuit 20. Downward movement of the punch 54 is limited by punch extensions 58 which extend from the punch body 56. At the furthest downward movement of the punch 54, the punch extensions 58 hit against the stiffening block 48 to limit any further downward movement of the punch 54. Pressure may be applied to the punch 54 by, for example, an Instron® testing machine. After the flex circuit 20 has been deformed, the pressure may be removed from the punch 54 and the punch 54 raised.

The punch 54 may additionally have cavities 60 for running a heating fluid to heat up the punch and a cooling fluid to cool down the punch.

All of the base plate 32, wrinkle reducer 44, stiffening block 48 and punch 54 may be made of metal such as aluminum or stainless steel.

Figure 12:
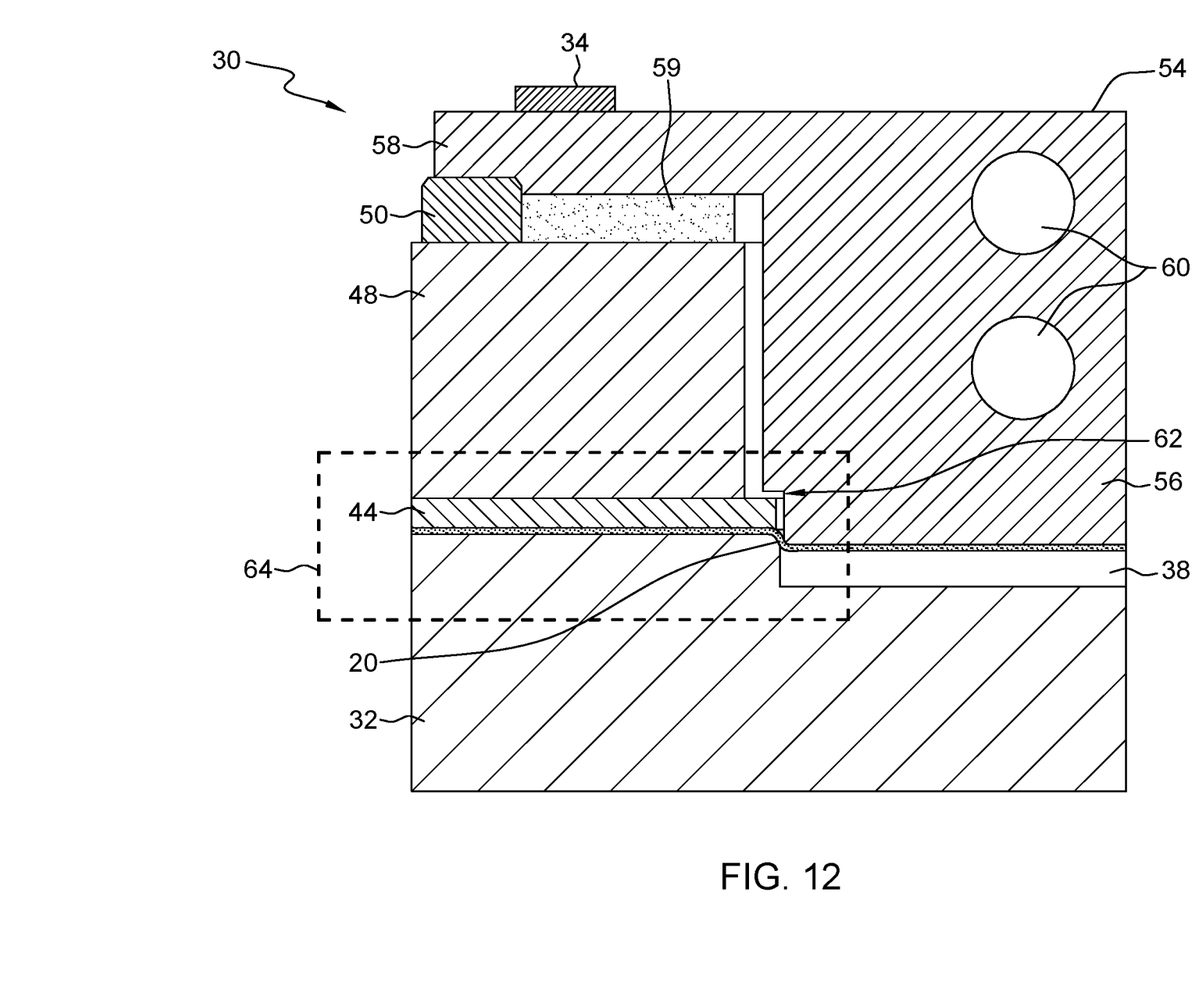
FIG. 12 illustrates the operation of the punch where the maximum downward movement of the punch is shown.

Referring now to FIG. 12, the operation of the punch of the fixture assembly 30 will be described in more detail where FIG. 12 illustrates the maximum downward movement of the punch 54.

The punch body 56 pushes down against the flex circuit 20 to cause the flex circuit 20 to be deformed into the recess 38 in the base plate 32. In its full downward travel the punch extensions 58, one of which is shown in FIG. 12, hits against the spacer 59 which acts as a hard stop to prevent further movement of the punch 54 downwardly. The spacer 59 is used so that the depth that the punch 54 goes down may be calibrated.

In one exemplary embodiment, the punch body 56 need not hit the bottom of the recess 38 but only extend far enough into the recess 38 to sufficiently deform the flex circuit 20. In another exemplary embodiment, the punch body 56 may have a notch 62 with enough clearance to avoid the vertical surfaces of the wrinkle reducer 44 and the recess 38 of the base plate 32. The spacer 59 prevents the horizontal surface of the notch 62 from impinging on the wrinkle reducer 44.

Figure 13:
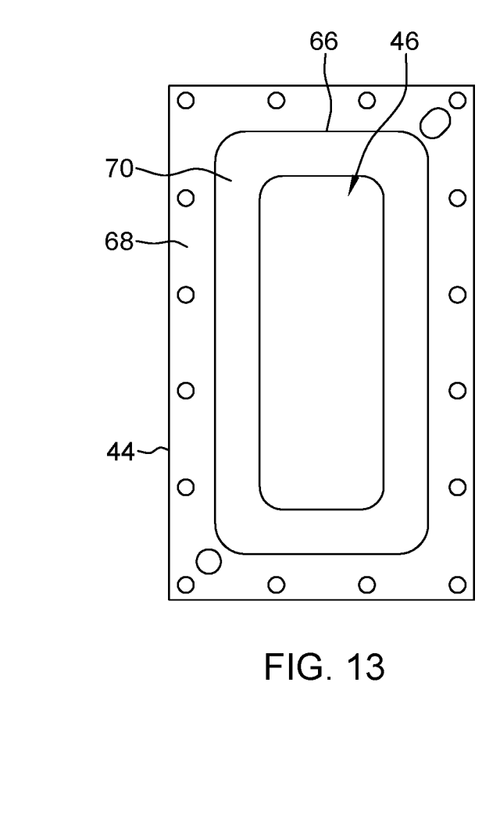
FIG. 13 illustrates a plan view of the wrinkle reducer.
Figure 14:
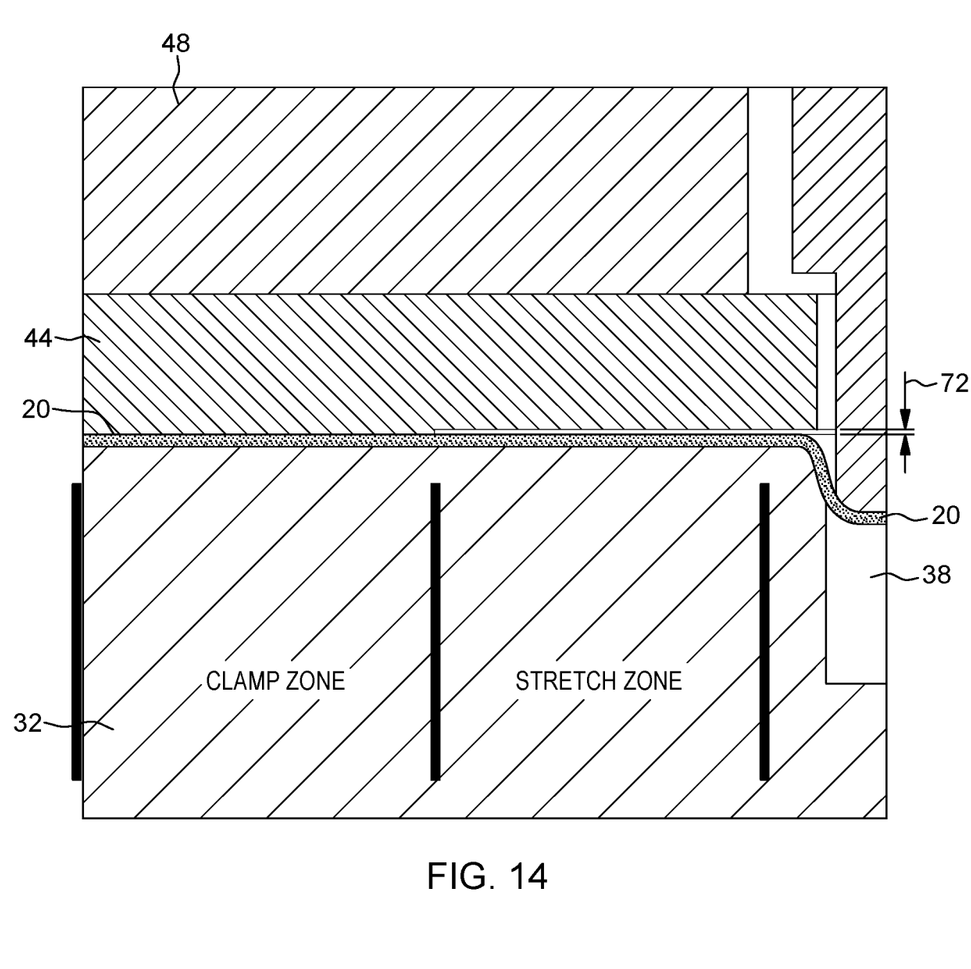
FIG. 14 illustrates in greater detail the portion of the fixture assembly outlined by the dotted line box in FIG. 12.

Referring now to FIG. 13 there is shown the wrinkle reducer 44 having cut-out portion 46 and FIG. 14 illustrates the portion of the fixture assembly 30 outlined by dotted line box 64 in FIG. 12 in greater detail. Referring first to FIG. 13, for the purpose of illustration and not limitation, a line 66 has been shown on the surface of the wrinkle reducer 44. The outer portion 68 of the wrinkle reducer 44, to the outside of line 66, is the part that clamps the flex circuit 20 to the base plate 32. The clamping force is provided by the stiffening block 48. The inner portion 70 of the wrinkle reducer 44, to the inside of line 66, does not actually clamp the flex circuit 20 but rather allows the flex circuit 20 to stretch during deformation of the flex circuit 20. The relative proportions of the clamp zone and stretch zone may be empirically determined.

Referring now to FIG. 14, it can be seen that the flex circuit 20 is firmly clamped between the wrinkle reducer 44 and the base plate 32 in the clamp zone. However, in the stretch zone there is an approximate 3 mil space 72 between the flex circuit 20 and the wrinkle reducer 44 so that any wrinkles that form in the flex circuit 20 during the deformation process do not have room to grow. Any wrinkles that form are usually formed near the corners. The 3 mil space 72 keeps the amplitude, that is the vertical height, of the wrinkles to a minimum.

Figure 15:
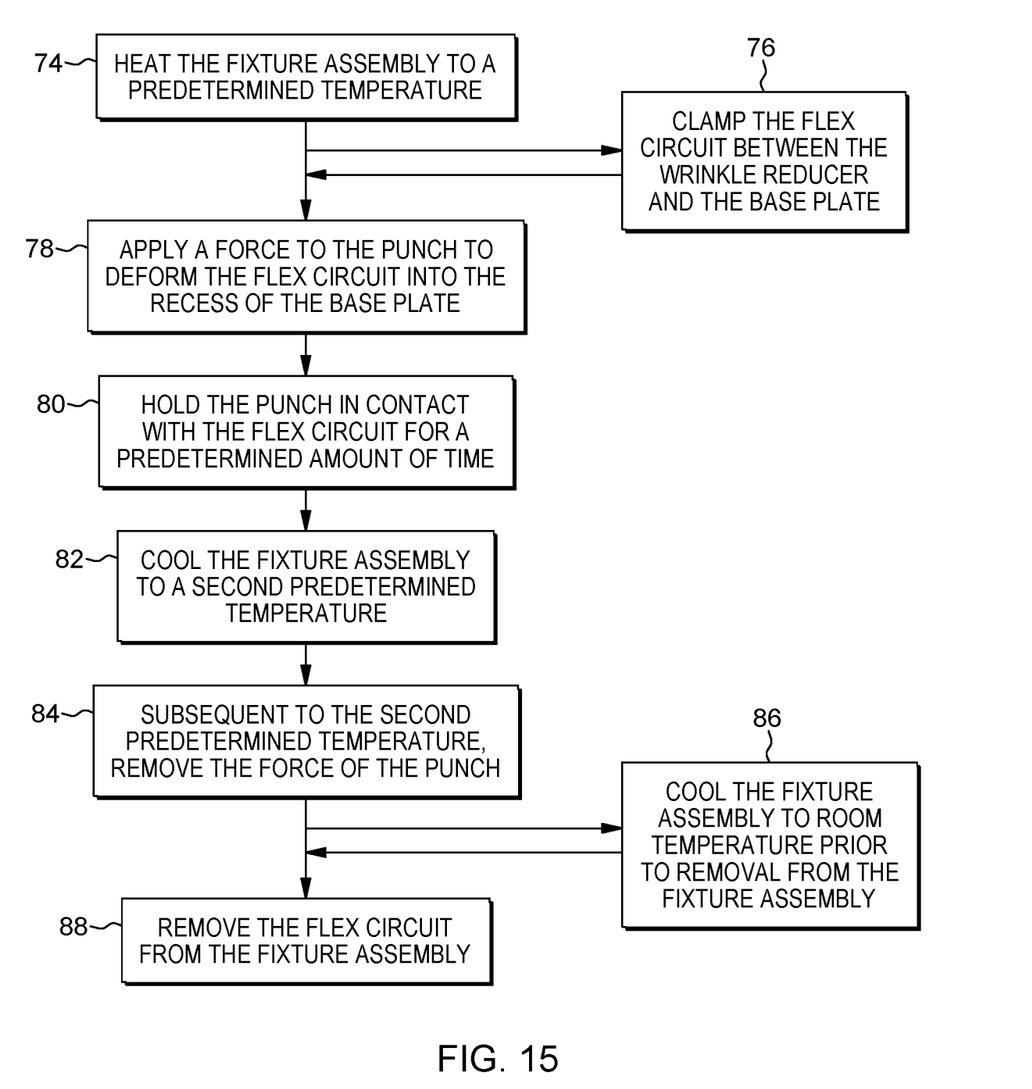
FIG. 15 illustrates a process for forming a flex circuit using a fixture assembly.

Referring now to FIG. 15, there is illustrated a process for forming a flex circuit using a fixture assembly, such as the fixture assembly in FIGS. 6 to 11, which includes a base plate having a recess, a wrinkle reducer, a stiffening block and a punch.

The process includes heating the fixture assembly 30 to a predetermined temperature, box 74. In one exemplary embodiment, the heating temperature may be about 130° C. The upper limit may be chosen to avoid material damage to the flex circuit 20.

The fixture assembly 30 may be heated by heating the base plate 32 with heaters 36 and running a hot fluid through one of the cavities 60 in the punch 54. The temperature may be monitored by thermocouples (not shown) in multiple places in the fixture assembly 30. It may be desirable to let the fixture assembly 30 sit at the predetermined temperature for a period of time, for example 5 minutes, to assure that the fixture assembly 30 has been evenly heated.

In one exemplary embodiment, the flex circuit 20 may be clamped between the wrinkle reducer 44 and the base plate 32, box 76.

A force may be applied to the punch 54 causing the punch 54 to contact the flex circuit 20 and deform the flex circuit 20 into the recess 38 in the base plate 32, box 78. It may be desirable to move the punch 54 downwardly at a constant rate until the punch 54 reaches its maximum limit of travel. In one exemplary embodiment, the maximum limit of travel may be reached when the punch extensions 58 hit against the spacer 59 or, if there is no spacer 59, then stiffening block 48.

The punch 54 may be held in contact with the deformed flex circuit 20 for a predetermined amount of time, for example 5 minutes, while the fixture assembly is heated at the predetermined temperature, box 80.

The fixture assembly 30 may be cooled to a second predetermined temperature with the punch 54 in contact with the deformed flex circuit 20, box 82. The second predetermined temperature may be, for example, 100° C. and no higher. The 100° C. temperature is preferred to avoid forming steam during cooling of the fixture assembly 30.

To cool the fixture assembly 30, air may be used.

After the fixture assembly 30 has reached the second predetermined temperature, the force of the punch 54 may be removed, box 84.

The flex circuit 30 may be removed from the fixture assembly 30, box 88. In one exemplary embodiment, fixture assembly 30 may be cooled to room temperature by water prior to removal of the flex circuit 20 from the fixture assembly 30, box 86. The flex circuit removed from the fixture assembly 30 may have a recessed portion 24 resulting from deforming the flex circuit 20 into the recess 38 in the base plate 32 and a flat portion 28 surrounding the recessed portion 24.

Figure 16:
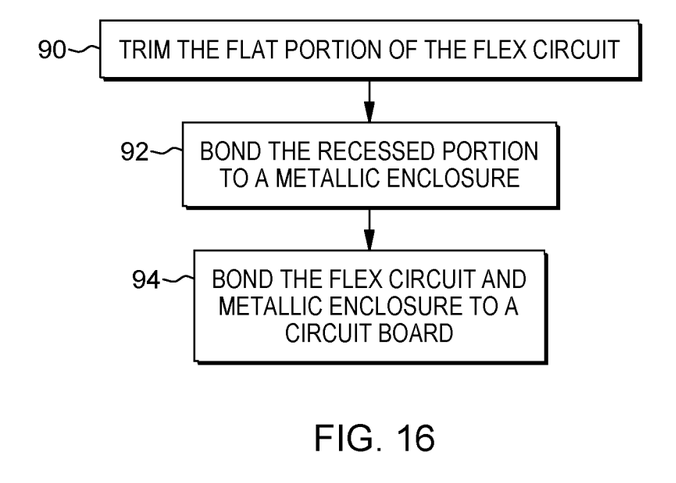
FIG. 16 illustrates a process in which the deformed flex circuit fabricated by the process in FIG. 15 may be further processed.

Referring now to FIG. 16, in one exemplary embodiment, the deformed flex circuit 20 deformed by the process in FIG. 15 may be further processed. The flat portion 28 surrounding the recessed portion 24 may be trimmed such as by cutting most of the excess off the flex circuit 30. For the purpose of illustration and not limitation, there may be maintained a flat border of approximate width 2 mm (millimeters) surrounding the recessed portion 24, box 90. However, the width of the flat border remaining depends on the application. Thus, there may be more than 2 mm left as the flat border or there may be no flat border at all.

The recessed portion 24 of the flex circuit 20 may be bonded, for example by an adhesive (not shown), to a metallic enclosure 18, box 92.

The flex circuit 30 and metallic enclosure 18 may be bonded, for example by an adhesive (not shown), to a circuit board 12, box 94.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A fixture assembly for deforming a flex circuit comprising:
    a base plate having a recess;
    a wrinkle reducer plate having a first cut-out portion aligned with the recess;
    a stiffening block having a second cut-out portion aligned with the recess and the first cut-out portion; and
    a punch to slideably engage with the recess, the first cut-out portion and the second cut-out portion;
    wherein, in operation, a flex circuit is placed between the base plate and wrinkle reducer plate and the punch extends through the first cut-out portion and the second cut-out portion to engage the flex circuit and deform the flex circuit into the recess so that the flex circuit has a formed section in the shape of the recess and a flat section clamped by the wrinkle reducer plate and the base plate.

2. The fixture assembly of claim 1 wherein the fixture assembly further comprising heaters in the base plate.

3. The fixture assembly of claim 2 wherein the fixture assembly further comprising a heater in the punch.

4. The fixture assembly of claim 1 wherein the recess has a width and a length such that the width and length of the recess is smaller than a width and length of the second cut-out portion.

5. The fixture assembly of claim 1 wherein the first and second cut-out portions are in a center of the wrinkle reducer and the stiffening block, respectively.

6. The fixture assembly of claim 1 wherein the wrinkle reducer has a clamp zone at an edge of the wrinkle reducer in which the flex circuit is clamped and a stretch zone between the clamp zone and the first cut-out portion in which the flex circuit is not clamped.

7. The fixture assembly of claim 6 wherein the wrinkle reducer has a first thickness in the clamp zone and a second thickness in the stretch zone wherein the second thickness is less than the first thickness so as to provide a gap between the wrinkle reducer and the flex circuit when the flex circuit is placed between the base plate and the wrinkle reducer.

8. The fixture assembly of claim 1 wherein the flex circuit has one or more tamper detection circuits.

* * * * *